United States Patent
Otsuki et al.

(10) Patent No.: US 9,859,556 B2
(45) Date of Patent: *Jan. 2, 2018

(54) HYDROGEN ABSORPTION ALLOY POWDER, NEGATIVE ELECTRODE, AND NICKEL-HYDROGEN SECONDARY CELL

(71) Applicant: SANTOKU CORPORATION, Kobe-shi, Hyogo (JP)

(72) Inventors: Takayuki Otsuki, Kobe (JP); Akiyasu Ota, Kobe (JP); Yasunori Yanagi, Kobe (JP)

(73) Assignee: SANTOKU CORPORATION, Hyogo (JP)

( * ) Notice: Subject to any disclaimer, the term of this patent is extended or adjusted under 35 U.S.C. 154(b) by 819 days.

This patent is subject to a terminal disclaimer.

(21) Appl. No.: 14/377,209

(22) PCT Filed: Feb. 7, 2013

(86) PCT No.: PCT/JP2013/052826
§ 371 (c)(1),
(2) Date: Aug. 7, 2014

(87) PCT Pub. No.: WO2013/118806
PCT Pub. Date: Aug. 15, 2013

(65) Prior Publication Data
US 2015/0243976 A1 Aug. 27, 2015

(30) Foreign Application Priority Data
Feb. 9, 2012 (JP) .................................. 2012-025896

(51) Int. Cl.
*H01M 4/38* (2006.01)
*C22C 19/03* (2006.01)
(Continued)

(52) U.S. Cl.
CPC ............ *H01M 4/383* (2013.01); *C22C 1/0433* (2013.01); *C22C 19/03* (2013.01); *H01M 10/345* (2013.01);
(Continued)

(58) Field of Classification Search
CPC ..... H01M 4/383; H01M 10/345; C22C 19/03; C22C 1/0433
See application file for complete search history.

(56) References Cited

U.S. PATENT DOCUMENTS 5,219,678 A 6/1993 Hasebe et al.
6,214,492 B1 4/2001 Kono et al.
(Continued)

FOREIGN PATENT DOCUMENTS

JP 03-116655 A 5/1991
JP 05-3031 A 1/1993
(Continued)

OTHER PUBLICATIONS

European Patent Office, Communication dated Feb. 8, 2016, issued in counterpart European Application No. 13746763.5.
(Continued)

*Primary Examiner* — Stewart Fraser
(74) *Attorney, Agent, or Firm* — Sughrue Mion, PLLC

(57) ABSTRACT

Hydrogen storage alloy powder, an anode, and a nickel-hydrogen rechargeable battery are provided, which are excellent in low-temperature characteristics and both in initial activity and cycle life at the same time, which properties are trading-off in conventional nickel-hydrogen rechargeable batteries. The alloy powder has a composition represented by formula (1) $R_{1-a}Mg_aNi_bAl_cM_d$ (R: rare earth elements including Sc and Y, or the like; $0.005 \leq a \leq 0.40$, $3.00 \leq b \leq 4.50$, $0 \leq c \leq 0.50$, $0 \leq d \leq 1.00$, $3.00 \leq b+c+d \leq 4.50$), and has an arithmetical mean roughness (Ra) of the powder
(Continued)

particle outer surface of not less than 2 μm, or a crushing strength of not higher than 35,000 gf/mm².

21 Claims, 1 Drawing Sheet

(51) Int. Cl.
*C22C 1/04* (2006.01)
*H01M 10/34* (2006.01)
*H01M 4/02* (2006.01)
*B22F 1/00* (2006.01)

(52) U.S. Cl.
CPC ........ *B22F 1/0003* (2013.01); *C22C 2202/04* (2013.01); *H01M 2004/021* (2013.01); *H01M 2004/027* (2013.01); *Y10T 428/12993* (2015.01)

(56) References Cited

U.S. PATENT DOCUMENTS

| | | | |
|---|---|---|---|
| 6,268,084 B1 | 7/2001 | Hayashida et al. | |
| 6,338,916 B1 | 1/2002 | Irie et al. | |
| 7,309,547 B2* | 12/2007 | Murata | H01M 4/242 420/900 |
| 9,343,737 B2* | 5/2016 | Otsuki | C22C 19/00 |
| 2001/0041292 A1 | 11/2001 | Hayashida et al. | |
| 2007/0105018 A1* | 5/2007 | Magari | H01M 4/366 429/218.2 |
| 2009/0226342 A1* | 9/2009 | Kanemoto | H01M 4/383 420/455 |
| 2010/0028774 A1* | 2/2010 | Ohyama | C22C 9/02 429/206 |
| 2011/0052983 A1* | 3/2011 | Magari | H01M 4/242 429/212 |
| 2011/0151320 A1* | 6/2011 | Ishida | C22C 19/03 429/206 |
| 2011/0192506 A1 | 8/2011 | Kanemoto et al. | |
| 2012/0164527 A1* | 6/2012 | Saguchi | H01M 4/242 429/206 |

FOREIGN PATENT DOCUMENTS

| | | |
|---|---|---|
| JP | 05-225975 A | 9/1993 |
| JP | 07-296810 A | 11/1995 |
| JP | 11-323469 A | 11/1999 |
| JP | 2000-228191 A | 8/2000 |
| JP | 2004-263213 A | 9/2004 |
| JP | 2004-273261 A | 9/2004 |
| JP | 2008-210554 A | 9/2008 |
| JP | 2008-210556 A | 9/2008 |
| JP | 2011-127185 A | 6/2011 |
| WO | 2007018292 A1 | 2/2007 |

OTHER PUBLICATIONS

Zhong Zhang et al. "Electrochemical properties of $Ml_{1-x}Mg_xNi_{3.0}Mn_{0.10}Co_{0.55}Al_{0.10}$ (x=0.05-0.30) hydrogen storage alloys" Journal of Alloys and Compounds, , Apr. 4, 2007, vol. 431, No. 1-2, pp. 208-211.

T. Suda, et al., "Material Factors in the Decrepitation of Hydrogen Storage Alloys", J. Japan Inst. Metals, vol. 63, No. 5 (1999), pp. 601-604.

Sato, Y., et al., "The Particle Size Effect of Metal Hydrides on the Discharge Capacity of a Nickel Hydrogen Battery", Electrochemistry, Dec. 1993, vol. 61, No. 12, pp. 2-6 (5 pages).

International Searching Authority, International Search Report for PCT/JP2013/052826, dated Apr. 9, 2013 (PCT ISA 210).

International Searching Authority, Written Opinion for PCT/JP2013/052826, dated Apr. 9, 2013 (PCT ISA 237).

* cited by examiner

HYDROGEN ABSORPTION ALLOY POWDER, NEGATIVE ELECTRODE, AND NICKEL-HYDROGEN SECONDARY CELL

CROSS REFERENCE TO RELATED APPLICATIONS

This application is a National Stage of International Application No. PCT/JP2013/052826, filed Feb. 7, 2013, claiming priority from Japanese Patent Application No. 2012-025896, filed Feb. 9, 2012, the contents of all of which are incorporated herein by reference in their entirety.

FIELD OF ART

The present invention relates to hydrogen storage alloy powder, an anode for a nickel-hydrogen rechargeable battery, and a nickel-hydrogen rechargeable battery.

BACKGROUND ART

Nickel-hydrogen rechargeable batteries with an anode containing a hydrogen storage alloy provide higher energy density compared to nickel-cadmium rechargeable batteries, and pose less environmental burden in the absence of poisonous Cd. Nickel-hydrogen rechargeable batteries have been used in portable appliances such as digital cameras, and electric tools, as well as in electric vehicles and hybrid-type electric vehicles, and demanded to provide various battery characteristics depending on their applications.

As conventional anode materials for nickel-hydrogen rechargeable batteries, there have been used a $LaNi_5$ hydrogen storage alloy, which is a rare earth-Ni intermetallic compound having the $CaCu_5$ crystal structure as the main phase, a hydrogen storage alloy containing Ti, Zr, V, and Ni as the constitutional elements and having Laves crystal structure as the main phase, or the like alloys.

Rare earth-Mg—Ni hydrogen storage alloys have recently been put into practical use, and nickel-hydrogen rechargeable batteries employing the alloys as the anode material are known to have high capacity.

Patent Publication 1 proposes a hydrogen storage alloy represented by a general formula $AM_x$ (1), where A is at least one element selected from IIA group and IIIB group, and M is at least one element selected from VB group, VIB group, VIIB group, VIIIB group, IB group, IIB group, IIIA group, IVA group, and VA group, and x meets the relationship of $2.7<x<3.8$, wherein an average atomic radius r (in angstrom) meets the relationship $1.36 \leq r \leq 1.39$ (2), and x in the general formula (1) and r meet the relationship $1.41 \leq 0.017x+r \leq 1.45$ (3). The publication discloses that this hydrogen storage alloy has a high hydrogen storage capacity, and a nickel-hydrogen rechargeable battery employing the hydrogen storage alloy in its anode is excellent in cycle life.

Patent Publication 2 proposes a hydrogen absorbing alloy represented by formula $RE_{1-x}Mg_xNi_yAl_zM_a$, wherein RE is at least one of Pr and Nd, M is an element other than a rare earth element, Mg, Ni, and Al, and x, y, z, and a fulfill the relationship of $0.15 \leq x \leq 0.30$, $2.8 \leq y \leq 3.9$, $0<z \leq 0.30$, and $3.0 \leq y+z+a \leq 3.6$ by atomic ratio, and having an intensity ratio $(I_A/I_B)$ of not smaller than 0.6, where $I_A$ represents an intensity of the highest peak in a range of $2\theta=30°$ to $34°$ in the X-ray diffraction pattern using CuKα-radiation as the X-ray source and $I_B$ represents the intensity of the highest peak in a range of $2\theta=40°$ to $44°$. The publication discloses that this hydrogen absorbing alloy has excellent corrosion resistance, and a nickel-hydrogen rechargeable battery employing the hydrogen absorbing alloy in its anode is excellent in cycle life.

However, the nickel-hydrogen rechargeable batteries employing the hydrogen storage alloys disclosed in Patent Publications 1 and 2 do not fulfill both the initial activity and the cycle characteristics at the same time.

Patent Publication 1: JP-2000-228191-A
Patent Publication 2: JP-2004-263213-A

SUMMARY OF THE INVENTION

It is an object of the present invention to provide hydrogen storage alloy powder excellent both in initial activity and cycle life at the same time, which properties are in a trade-off relationship in conventional nickel-hydrogen rechargeable batteries, and also excellent in discharge capacity.

It is another object of the present invention to provide a nickel-hydrogen rechargeable battery and an anode for the rechargeable battery which provide excellent initial activity and cycle life and have high discharge capacity.

According to the present invention, there is provided hydrogen storage alloy powder of a composition represented by formula (1):

wherein R is at least one element selected from the group consisting of rare earth elements including Sc and Y, Zr, Hf, and Ca; M is at least one element selected from the group consisting of elements other than R, Mg, Ni, and Al; and a satisfies $0.005 \leq a \leq 0.40$, b satisfies $3.00 \leq b \leq 4.50$, c satisfies $0 \leq c \leq 0.50$, and d satisfies $0 \leq d \leq 1.00$, with $3.00 \leq b+c+d \leq 4.50$; wherein said powder has an arithmetical mean roughness (Ra) of powder particle outer surface of not less than 2 μm.

According to the present invention, there is also provided hydrogen storage alloy powder of the composition represented by formula (1), having a crushing strength of not higher than 35,000 gf/mm².

According to the present invention, there is further provided an anode for a nickel-hydrogen rechargeable battery employing the hydrogen storage alloy powder, and a nickel-hydrogen rechargeable battery employing the anode.

The hydrogen storage alloy powder according to the present invention (sometimes referred to simply as the alloy powder hereinbelow) has a specific composition, and a specific arithmetical mean roughness of powder particle outer surface and/or a specific crushing strength. Thus, by using an anode prepared with the alloy powder in a nickel-hydrogen rechargeable battery, both the initial activity and the cycle life of the rechargeable battery are made excellent at the same time, as well as the discharge capacity.

PREFERRED EMBODIMENTS OF THE INVENTION

Figure 1:
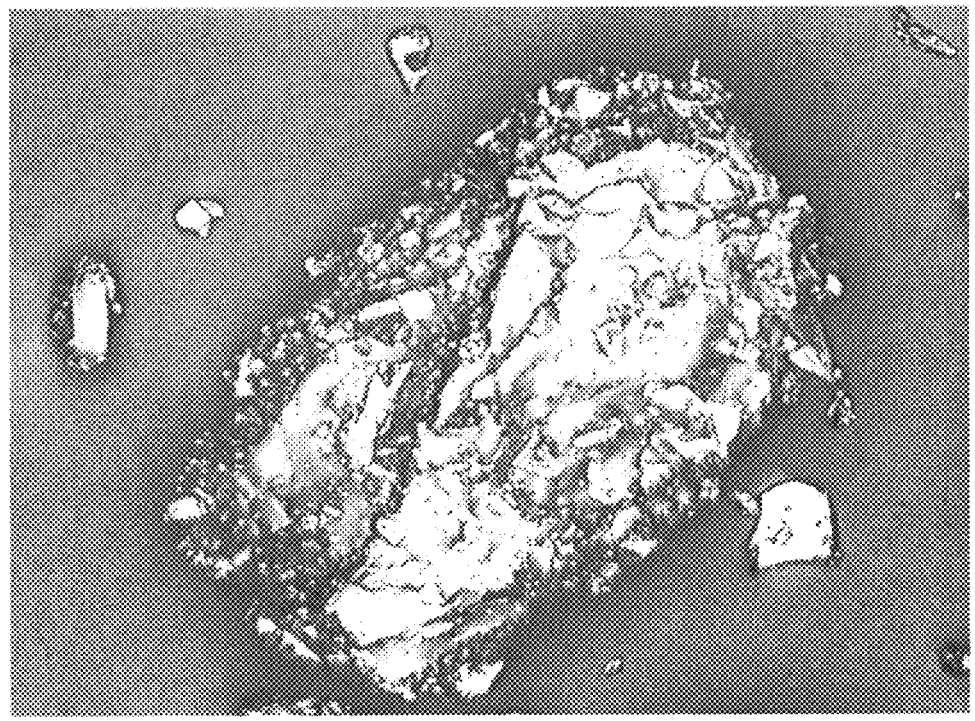
FIG. 1 is a photocopy of a laser micrograph of the hydrogen storage alloy powder prepared in Example 1.

The present invention will now be explained in detail.
The hydrogen storage alloy powder according to the present invention has an alloy composition represented by formula (1) above.

In formula (1), R is at least one element selected from the group consisting of rare earth elements including Sc and Y, Zr, Hf, and Ca, and preferably one, two or more elements selected from the group consisting of La, Nd, Pr, Sm, Y, and Zr. La tends to lower the equilibrium pressure of an alloy upon hydrogen absorption/desorption, whereas Nd, Pr, Sm, Y, and Zr tend to increase the same.

In formula (1), 1−a denotes the content of R, and satisfies $0.60 \leq 1-a \leq 0.995$, preferably $0.75 \leq 1-a \leq 0.95$.

In formula (1), a denotes the content of Mg, and satisfies $0.005 \leq a \leq 0.40$, preferably $0.05 \leq a \leq 0.25$. At too low a Mg content, sufficient hydrogen storage capacity is not achieved and, when the alloy powder is used in a rechargeable battery, the discharge capacity may be low. At too high a Mg content, sufficient corrosion resistance may not be achieved and, when the alloy powder is used in a rechargeable battery, the cycle characteristics may be poor. Mg tends to increase the hydrogen storage capacity and the equilibrium pressure of the alloy powder upon hydrogen absorption/desorption.

In formula (1), b denotes the content of Ni, and satisfies $3.00 \leq b \leq 4.50$, preferably $3.00 \leq b \leq 4.00$, more preferably $3.00 \leq b \leq 3.80$. At too low a Ni content, the alloy powder is prone to decrepitation and, when the alloy powder is used in a rechargeable battery, the cycle characteristics may be poor. At too high a Ni content, sufficient hydrogen storage capacity may not be achieved and, when the alloy powder is used in a rechargeable battery, sufficient discharge capacity may not be achieved.

In formula (1), c denotes the content of Al, and satisfies $0 \leq c \leq 0.50$, preferably $0.05 \leq c \leq 0.50$, more preferably $0.05 \leq c \leq 0.30$. Al is not necessarily contained but, when contained, increases the corrosion resistance, and contributes to improvement in cycle characteristics when used in a rechargeable battery. In addition, Al tends to lower the equilibrium pressure of the alloy powder upon hydrogen absorption/desorption, and contributes to improvement in initial capacity and the like when the alloy powder is used in a rechargeable battery. On the other hand, at too high an Al content, sufficient hydrogen storage capacity may not be achieved, and sufficient corrosion resistance may not be achieved due to segregation of Al.

In formula (1), M is at least one element selected from the group consisting of elements other than R, Mg, Ni, and Al, and may arbitrarily be selected from the elements which contribute to fine adjustment of battery characteristics depending on the battery application. Element M may specifically be at least one element selected from the group consisting of Ti, V, Nb, Ta, Cr, Mo, W, Mn, Fe, Co, Cu, Zn, B, Ga, Sn, Sb, In, C, Si, and P, preferably at least one element selected from the group consisting of Ti, Nb, Mo, W, Mn, Fe, Co, Cu, B, and Sn. For example, when at least one element selected from the group consisting of Ti, Nb, Mo, W, Fe, Cu, Sn, and B is contained as element M, decrepitation of the alloy powder is suppressed, or elution of Al into the electrolytic solution is inhibited.

In formula (1), d denotes the content of element M, and satisfies $0 \leq d \leq 1.00$, preferably $0 \leq d \leq 0.50$. Element M is not necessarily contained, but may be contained when fine adjustment of battery characteristics to the battery application is required.

In formula (1), b+c+d denotes the content of the elements other than R and Mg. These elements affect mainly decrepitation of the alloy powder and, when the alloy powder is used in a rechargeable battery, contribute particularly to improvement in cycle characteristics. The value b+c+d satisfies $3.00 \leq b+c+d \leq 4.50$, preferably $3.00 \leq b+c+d \leq 4.00$, more preferably $3.00 \leq b+c+d \leq 3.80$.

The composition of the alloy powder of the present invention may be confirmed by quantitative analysis using ICP (Inductively Coupled Plasma).

The arithmetical mean roughness (Ra) of the powder particle outer surface of the hydrogen storage alloy powder according to the present invention is not less than 2 µm, preferably not less than 3 µm. The maximum roughness is not particularly limited, and about 8 µm. With the Ra of the outer surface of the alloy powder particle of not less than 2 µm, when the alloy powder is used in a rechargeable battery, the initial activity and the cycle characteristics are both excellent at the same time. With the Ra of not less than 2 µm, fine irregularities are present on the outer surface of the alloy powder particle, which is assumed to facilitate smooth absorption/desorption of hydrogen. When the alloy powder is used in a rechargeable battery, the output characteristics and the charge/discharge characteristics at lower temperatures are better with a higher Ra. It should be noted that a larger specific surface area of the alloy powder is different from the Ra of not less than 2 µm, and the effects of the present invention cannot be achieved at a lower particle size with a larger specific surface area. It is more important to set the mean volume diameter (MV) in a preferred range as will be discussed later.

The arithmetical mean roughness (Ra) may be determined as follows.

Alloy powder particles of 50 to 100 µm in diameter were subjected to measurement of roughness under a laser microscope (VK-9519 manufactured by KEYENCE CORPORATION) along three line segments dividing the long axis diameter of a powder particle into four and three line segments dividing the short axis diameter (the line segment extending at right angle to and evenly dividing the long axis diameter) into four, i.e., along in total of six line segments, and the average of four values out of the measured values except for the maximum and the minimum is calculated. For the present invention, the average was calculated for each of five of the alloy powder particles in this way, and the average of these averages was taken as the arithmetical mean roughness (Ra).

The crushing strength of the hydrogen storage alloy powder according to the present invention is not higher than 35,000 gf/mm². Preferably, when $0.01 \leq a \leq 0.15$ and $3.00 \leq b+c+d \leq 3.80$ in formula (1), the crushing strength is not higher than 20,000 gf/mm², or when $0.15 < a \leq 0.25$ and $3.00 \leq b+c+d \leq 3.80$ in formula (1), the crushing strength is not higher than 30,000 gf/mm². The minimum crushing strength may usually be about 6,000 gf/mm². At a crushing strength of not higher than 35,000 gf/mm², the alloy powder, when used in an anode of a rechargeable battery, makes both the initial activity and the cycle characteristics excellent at the same time. The reason for this fact is not known, but as a result of repeated experiments, it has been confirmed that these characteristics are evidently excellent when the crushing strength is not higher than 35,000 gf/mm².

The crushing strength may be determined as follows.

Alloy powder particles of 50 to 100 µm in diameter were subjected to measurement of the load at which a powder particle was crushed, using a powder hardness tester (BHT-500 manufactured by SEISHIN ENTERPRISE CO., LTD.) with a load cell at 500 gf at room temperature (20° C.). The measured value was divided by the cross sectional area of the sphere approximated from the particle diameter of the powder particle before loading, taken in the direction of the load of the load cell, and was taken as a crushing strength. For the present invention, each of fifteen of the alloy powder particles was subjected to the measurement in this way to obtain a respective crushing strength, and the average of eleven values out of the obtained values except for the first and second largest and smallest was taken as the crushing strength.

The hydrogen storage alloy powder according to the present invention preferably has a mean volume diameter (MV) of 20 to 100 μm. The hydrogen storage alloy powder according to the present invention preferably has a D10 (the particle size at which the cumulative volume fraction is 10%) of 5 to 30 μm, and a D90 (the particle size at which the cumulative volume fraction is 90%) of 40 to 180 μm. When an anode for a nickel hydrogen rechargeable battery is prepared from the alloy powder of such a particle diameter, an electrically conductive material, a binder, and the like, the alloy powder may be packed at a high density.

The method for producing the hydrogen storage alloy powder according to the present invention is not particularly limited, but a method which provides a gradient in at least Mg concentration among the above-mentioned composition which, for example, gradually lowers from the outer surface toward the center of the hydrogen storage alloy powder particle to be obtained, is preferred for facilitating achievement of the effects of the present invention. Such a production method may include the steps of, for example: (1) preparing alloy powder of the above-mentioned composition of the hydrogen storage alloy powder according to the present invention, from which at least Mg is excluded; (2) preparing powder of Mg metal or a Mg-containing alloy, separately from the production of the alloy powder without Mg; (3) mixing the powders prepared insteps (1) and (2); (4) heat-treating the obtained mixture; and (5) loosening or pulverizing the heat treated alloy powder.

Step (1) may be carried out in a known manner, for example, by strip casting, such as single roll method, twin roll method, or disc method, or by metal mold casting.

In strip casting, raw materials blended to have a predetermined alloy composition without Mg are prepared. Then the blended raw materials are melted under heating in an inert gas atmosphere into an alloy melt, and pouring the alloy melt onto a water-cooled copper roll to rapidly cool and solidify the alloy melt into alloy flakes. On the other hand, in metal mold casting, the alloy melt obtained as above is poured into a water-cooled copper mold to cool and solidify the same into an ingot. The cooling rate differs between strip casting and metal mold casting. For obtaining an alloy with uniform composition distribution and less segregation, strip casting is preferred. For obtaining an alloy with uniform composition distribution and less segregation, the obtained alloy without Mg may be subjected to heat treatment.

Next, the cast alloy is pulverized into alloy powder. The pulverization may be performed in a known pulverizer. For smooth Mg-diffusion into and -reaction with the alloy powder without Mg in the heat treatment step to be discussed later, the particle diameter of the alloy powder is preferably 20 to 100 μm in MV.

In step (2), powder of Mg metal may be prepared by pulverizing Mg metal bar in a known pulverizer. Powder of a Mg-containing alloy may be prepared in the same way as the alloy powder without Mg. In order to prevent evaporation of Mg in heat treatment step (4) to be discussed later, the melting point of the Mg-containing alloy is preferably at as low a temperature as practical and not higher than the boiling point of Mg metal. For example, at least one element selected from the group consisting of Al, Cu, Zn, Ga, Sn, and In may be alloyed with Mg metal. Among these, Mg—Al alloys, Mg—In alloys, and Mg—Zn alloys are particularly preferred for their alloy melting points which are not higher than the boiling point of metal Mg. R to be combined with Mg metal may be, for example, La, Ce, Pr, Nd, Sm, Mm (Misch metal) containing these, Y, Eu, or Yb. For smooth Mg-diffusion into and -reaction with the alloy powder without Mg in heat treatment step (4) to be discussed later, the particle diameter of the Mg metal or the Mg-containing alloy is preferably 20 to 2000 μm, more preferably 20 to 1500 μm in mean particle diameter (D50).

In step (3), the alloy powder without Mg and the powder of Mg metal or a Mg-containing alloy prepared in steps (1) and (2), respectively, are blended and mixed to have a composition of a desired hydrogen storage alloy powder. It is preferred to achieve as uniform mixed state as possible for efficient diffusion and reaction of Mg in heat treatment step (4) to be discussed later.

The mixing may be carried out in a known mixer, for example, a rotary mixer such as of a double corn or V-shaped type, or a stirring mixer such as of a blade or screw type. It is also possible to pulverize and mix the alloy powder without Mg and the powder of Mg metal or a Mg-containing alloy in a pulverizer, such as a ball mill or an attritor mill.

Diffusion and reaction of Mg in step (4) to be discussed later may be effected usually at a relatively low temperature, such as at 400 to 1090° C., so that the amount of the components such as Mg evaporated is not very large. Strictly, however, the alloy powder without Mg and the powder of Mg metal or a Mg-containing alloy are blended in consideration of the yield of each component, so as to obtain an alloy of a desired composition.

In step (4), the obtained mixture is heat-treated preferably at 400 to 1090° C. for 0.5 to 240 hours. This heat treatment may be carried out in a known heat treatment furnace with atmosphere control. The heat treatment may be carried out while the mixture is mixed, for example, in a rotary furnace such as a rotary kiln. By this treatment, Mg in Mg metal or the Mg-containing alloy diffuses into and reacts with the alloy powder without Mg, and the hydrogen storage alloy powder is obtained. This heat treatment is preferably carried out at such a temperature for such a period that Mg is inhibited from evaporating and facilitated to diffuse and react. Particularly preferably, the temperature of the heat treatment is 500 to 1080° C. and the duration of the heat treatment is 1 to 24 hours. Since Mg is prone to oxidation, the heat treatment is carried out preferably in vacuum or an inert gas atmosphere, more preferably in an inert gas atmosphere under pressure. Under such conditions, not only oxidation but also evaporation of Mg is prevented.

The heat treatment in step (4) may be carried out in two or more steps within the temperature range of 400 to 1090° C. For example, the heat treatment may be carried out by holding the mixture in a temperature range slightly above the melting point of Mg metal or a Mg-containing alloy, and then raising the temperature to hold the mixture in a higher temperature range. In this way, the diffusion and reaction are effected more uniformly, and hydrogen storage alloy powder is obtained which has a gradient in at least Mg gradually lowered from the outer surface toward the center of a powder particle. The two-step heat treatment may be carried out, for example, by holding the mixture at 660 to 750° C. for 0.1 to 2.0 hours and then at 900 to 1080° C. for 4 to 24 hours.

In step (5), the heat-treated alloy powder is loosened or pulverized to give the hydrogen storage alloy powder having the Ra and/or the crushing strength discussed above. The loosening/pulverization is preferably carried out so that the resulting particle diameter is 20 to 100 μm in MV. The difference in MV between the alloy powder without Mg and the loosened/pulverized alloy powder is preferably not more than ±5 μm, more preferably not more than ±3 μm, most preferably not more than ±1 μm. By minimizing the change in MV before and after the diffusion and reaction of Mg, the Ra and/or the crushing strength of the hydrogen storage alloy powder are easily set within the above-mentioned ranges. Further, the difference in D10 between the alloy powder without Mg and the loosened/pulverized alloy powder is preferably not more than ±5 μm, more preferably not more than ±3 μm. The difference in D90 between the alloy powder without Mg and the loosened/pulverized alloy powder is preferably not more than ±10 μm, more preferably not more than ±5 μm. The loosening or pulverization may be carried out in a known pulverizer, such as a feather mill, a hammer mill, a ball mill, or an attritor mill, under suitably adjusted pulverizing conditions.

The anode for a nickel-hydrogen rechargeable battery according to the present invention contains the hydrogen storage alloy powder of the present invention as an anode active material for a nickel-hydrogen rechargeable battery. The anode active material of the present invention, i.e., the hydrogen storage alloy powder, may be subjected to known treatment prior to use, such as surface coating by plating or with a high polymer, or surface treatment with acidic or alkaline solution, depending on the desired characteristics.

In the anode for a nickel-hydrogen rechargeable battery according to the present invention, the content of the hydrogen storage alloy powder, which is an anode active material, is preferably not less than 80 mass %, more preferably not less than 95 mass % of the total amount of the materials constituting the anode, such as an electrically conductive material and a binder, exclusive of the collector.

The electrically conductive material may be a conventional one, for example, carbon black such as acetylene black or furnace black, carbonaceous material such as graphite, copper, nickel, or cobalt.

The binder may be a conventional one, for example, carboxymethyl cellulose, polyvinyl alcohol, polyvinylbutyral, polyvinylpyrrolidone, polyethylene oxide, polytetrafluoroethylene (PTFE), or ethylene-tetrafluoride-propylene hexafluoride copolymer (FEP).

The collector may be made of, for example, punched metal or foam metal. An anode for a nickel-hydrogen rechargeable battery is generally produced by a so-called paste method, thus a punched metal is used. Such a paste-type anode may be produced by mixing the hydrogen storage alloy powder of the present invention, a binder mentioned above, and optionally an electrically conductive material, an antioxidant, a surfactant, a thickener, or the like, with water as a solvent, into a paste, applying the paste to a collector, packing, drying, roller-pressing, and the like steps.

The anode for a nickel-hydrogen rechargeable battery of the present invention may have a water-repellent layer or an electrically conductive layer formed on its surface as desired. Such a layer may be formed by a conventional method. For example, the former may be formed by application of a fluorores in dispersion or the like followed by drying, whereas the latter by plating or the like.

The nickel-hydrogen rechargeable battery according to the present invention has the anode for a nickel-hydrogen rechargeable battery of the present invention. The remaining structures may be conventional.

The nickel-hydrogen rechargeable battery of the present invention may be in a variety of shapes, including a cylinder, a laminate, or a coin. In any shape, a nickel-hydrogen rechargeable battery is fabricated by placing a series of electrodes prepared by laminating an anode, a separator, and a cathode, in a stainless can or the like. In case of a cylindrical shape, the can generally acts as an anode terminal, so that the anode is connected to the anode terminal by rolling the series of electrodes into a roll with the anode outside, and inserting the roll into the can. The cathode is generally connected to a cathode terminal with a lead wire.

The separator may be made of, for example, a non-woven fabric of polymer fibers such as nylon, polypropylene, or polyethylene, or a porous polymer film such as of polyethylene or polypropylene.

The cathode usually contains nickel oxide and may be, for example, a non-sintered nickel electrode. A non-sintered nickel electrode is prepared by mixing nickel hydroxide, a binder, and optionally cobalt hydroxide, cobalt monoxide, and/or cobalt metal, with water as a solvent, into a paste, applying the paste to a collector of, for example, foam metal, packing, drying, roller-pressing, and the like steps.

In the container in which the series of electrodes has been placed, a 6 to 8 N potassium hydroxide solution as an alkaline electrolyte is introduced. An alkaline electrolyte containing lithium hydroxide or sodium hydroxide may also be used. The container is usually equipped with a gasket for sealing the battery, and a safety valve which operates upon pressure buildup in the battery.

EXAMPLES

The present invention will now be explained in detail with reference to Examples and Comparative Examples, which do not intend to limit the present invention.

Example 1

Raw materials of the composition of the hydrogen storage alloy powder as shown in Table 1 excluding Mg were measured out, and melted in a high-frequency melting furnace in an argon gas atmosphere into an alloy melt. The alloy melt, at a pouring temperature of 1420° C., was rapidly cooled and solidified by strip casting in a single roll casting system having a water-cooled copper roll, into flakes having thicknesses of 0.39 to 0.41 mm and an average thickness of 0.40 mm. The obtained flakes were pulverized in a ball mill into alloy powder having particle sizes of 75.1 μm in MV, 18.8 μm in D10, and 152.1 μm in D90. The composition of the obtained alloy powder was analyzed with ICP and found to be $La_{0.74}Sm_{0.05}Zr_{0.01}Ni_{3.48}Al_{0.18}$.

The alloy powder thus obtained was thoroughly mixed with Mg metal powder having a mean particle diameter (D50) of 110 μm in a mortar. The obtained mixture was held in an argon gas atmosphere at 700° C. for 30 minutes, and then at an elevated temperature of 970° C. for 12 hours. The composition of the obtained alloy powder was analyzed with ICP and found to be $La_{0.74}Sm_{0.05}Zr_{0.01}Mg_{0.20}Ni_{3.48}Al_{0.18}$. The heat-treated alloy powder was pulverized in a mortar to obtain hydrogen storage alloy powder having an MV of 75.7 μm, D10 of 19.8 μm, and D90 of 149.3 μm. A photocopy of a laser micrograph of the obtained hydrogen storage alloy powder is shown in FIG. 1.

Further, the MV of the alloy powder without Mg (referred to as MV(1) hereinbelow), the MV of the hydrogen storage alloy powder (referred to as MV(2) hereinbelow), the difference in MV between the alloy powder without Mg and the pulverized alloy powder (referred to as MV difference hereinbelow), the D10 of the alloy powder without Mg (referred to as D10 (1) hereinbelow), the D10 of the hydrogen storage alloy powder (referred to as D10(2) hereinbelow), the difference in D10 between the alloy powder without Mg and the pulverized alloy powder (referred to as D10 difference hereinbelow), the D90 of the alloy powder without Mg (referred to as D90(1) hereinbelow), the D90 of the hydrogen storage alloy powder (referred to as D90(2) hereinbelow), and the difference in D90 between the alloy powder without Mg and the pulverized alloy powder (referred to as D90 difference hereinbelow) are shown in Table 2.

Still further, the Ra and the crushing strength of the obtained hydrogen storage alloy powder were measured as discussed above and found out that the Ra was 3.5 μm and the crushing strength was 23,034 gf/mm². The results are shown in Table 3.

<Evaluation Test of Battery Characteristics>

The battery characteristics of the hydrogen storage alloy powder thus obtained were determined in the following manner. The results of the evaluation of the battery characteristics are shown in Table 3.

The hydrogen storage alloy powder at 0.15 g and 0.45 g of carbonyl nickel powder were thoroughly mixed in a mortar, and the resulting mixture was pressed at 2000 kgf/cm² into a pellet of 10 mm diameter. The pellet was held between two sheets of nickel mesh, and the periphery of the mesh sheets was spot-welded to press-contact the mesh sheets. Further, a nickel lead wire was spot-welded to the mesh sheets, to thereby prepare an anode. The obtained anode and a sintered nickel electrode as a counter electrode were immersed in a 8N aqueous KOH solution, and subjected to charge/discharge cycle test at 25° C.

The charge/discharge was effected using a charge/discharge device (manufactured by KEISOKUKI CENTER CO. LTD., trade name BS2500-05R1) by repeating 5 times the cycle of charging at a current of 150 mA per 1 g of the hydrogen storage alloy for 170 minutes, taking a break for 10 minutes, and discharging to a mercury oxide electrode at a current of 150 mA per 1 g of the hydrogen storage alloy to −0.7 V. The discharge capacity at the first cycle was 345 mAh/g, and that at the fifth cycle was 382 mAh/g. Then the temperature was lowered to 0° C., and the sixth cycle of charge/discharge was effected under the same conditions. The discharge capacity was 330 mAh/g.

Examples 2-18 and Comparative Examples 1 and 2

Hydrogen storage alloy powder was prepared in the same way as in Example 1 except that the composition of the raw materials was changed to obtain hydrogen storage alloy powder of the composition shown in Table 1. The conditions of pulverization of the alloy powder without Mg and the hydrogen storage alloy powder were changed to obtain the alloy powder without Mg and the hydrogen storage alloy powder each having the MV, D10, and D90 shown in Table 2. The Ra and the crushing strength of the obtained hydrogen storage alloy powder and the characteristics of the battery using the powder are shown in Table 3.

Comparative Example 3

Figure 2:
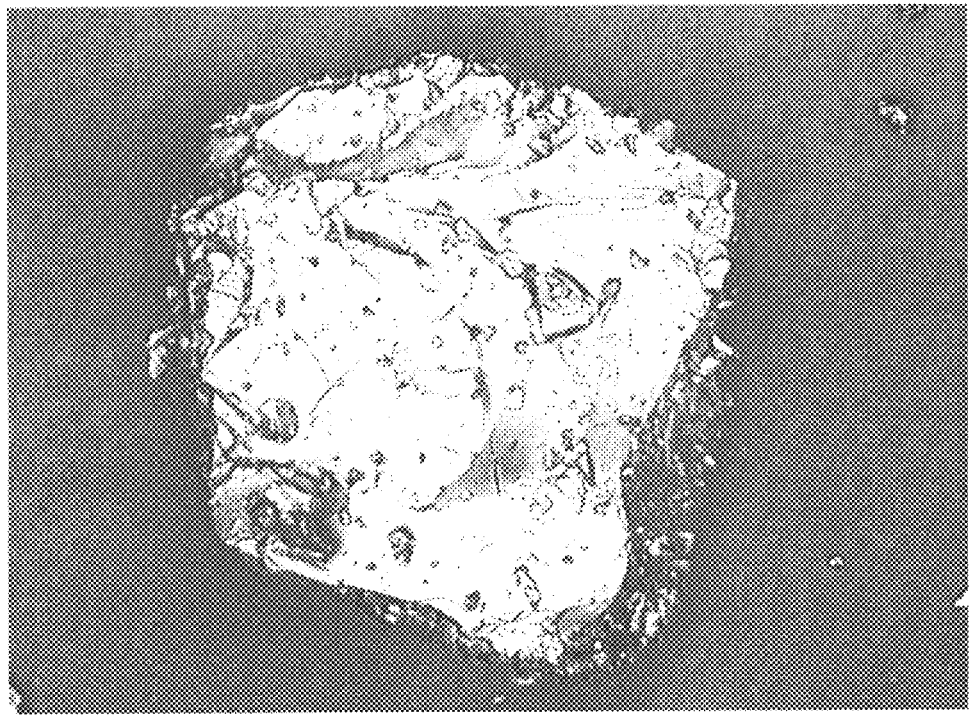
FIG. 2 is a photocopy of a laser micrograph of the hydrogen storage alloy powder prepared in Comparative Example 3.

All the raw materials including Mg metal were mixed together so as to obtain an alloy having the same composition as the hydrogen storage alloy powder of Example 1, and strip-casted in the same way as in Example 1 to obtain flakes. The flakes were heat-treated at 950° C. for 6 hours in an argon gas atmosphere. The heat-treated flakes were pulverized in a ball mill to obtain hydrogen storage alloy powder having an MV of 70.3 μm, D10 of 18.9 μm, and D90 of 151.6 μm. The composition of the obtained alloy powder was analyzed with ICP and found to be $La_{0.74}Sm_{0.05}Zr_{0.01}Mg_{0.20}Ni_{3.48}Al_{0.18}$. A photocopy of a laser micrograph of the obtained hydrogen storage alloy powder is shown in FIG. 2.

The MV, D10, and D90 of the obtained hydrogen storage alloy powder are shown in Table 2, and the Ra and the crushing strength of the obtained hydrogen storage alloy powder and the characteristics of the battery using the powder are shown in Table 3.

TABLE 1

| | Composition of hydrogen storage alloy power |
|---|---|
| Example 1 | $La_{0.74}Sm_{0.05}Zr_{0.01}Mg_{0.20}Ni_{3.48}Al_{0.18}$ |
| Example 2 | $La_{0.78}Zr_{0.01}Mg_{0.21}Ni_{3.44}Al_{0.15}$ |
| Example 3 | $La_{0.40}Ce_{0.05}Sm_{0.32}Mg_{0.23}Ni_{3.42}Al_{0.10}$ |
| Example 4 | $La_{0.40}Sm_{0.47}Mg_{0.13}Ni_{3.65}Al_{0.12}$ |
| Example 5 | $La_{0.40}Nd_{0.20}Sm_{0.30}Mg_{0.10}Ni_{3.48}Al_{0.18}$ |
| Example 6 | $Nd_{0.89}Mg_{0.11}Ni_{3.12}Al_{0.18}$ |
| Example 7 | $La_{0.30}Pr_{0.25}Nd_{0.35}Mg_{0.10}Ni_{3.30}Co_{0.15}Al_{0.08}$ |
| Example 8 | $La_{0.18}Pr_{0.37}Nd_{0.27}Mg_{0.18}Ni_{3.40}Mn_{0.03}Co_{0.03}Al_{0.08}$ |
| Example 9 | $La_{0.89}Y_{0.05}Mg_{0.16}Ni_{3.30}Al_{0.15}$ |
| Example 10 | $Pr_{0.19}Nd_{0.59}Mg_{0.22}Ni_{3.20}Cu_{0.05}Al_{0.10}$ |
| Example 11 | $La_{0.85}Mg_{0.15}Ni_{3.11}Fe_{0.05}Al_{0.10}$ |
| Example 12 | $La_{0.61}Nd_{0.19}Mg_{0.20}Ni_{3.35}Sn_{0.05}Al_{0.08}$ |
| Example 13 | $La_{0.23}Pr_{0.16}Nd_{0.39}Mg_{0.22}Ni_{3.20}Si_{0.05}Al_{0.10}$ |
| Example 14 | $La_{0.55}Sm_{0.35}Mg_{0.10}Ni_{3.25}Nb_{0.03}$ |
| Example 15 | $La_{0.70}Gd_{0.10}Mg_{0.20}Ni_{3.35}Al_{0.10}$ |
| Example 16 | $La_{0.50}Sm_{0.40}Mg_{0.10}Ni_{3.35}Al_{0.10}$ |
| Example 17 | $La_{0.60}Y_{0.35}Mg_{0.05}Ni_{3.50}Al_{0.12}$ |
| Example 18 | $La_{0.30}Pr_{0.05}Nd_{0.05}Y_{0.51}Mg_{0.09}Ni_{3.37}Al_{0.14}$ |
| Comp. Ex. 1 | $La_{0.74}Sm_{0.05}Zr_{0.01}Mg_{0.20}Ni_{3.48}Al_{0.18}$ |
| Comp. Ex. 2 | $La_{0.85}Mg_{0.15}Ni_{3.11}Fe_{0.05}Al_{0.10}$ |
| Comp. Ex. 3 | $La_{0.74}Sm_{0.05}Zr_{0.01}Mg_{0.20}Ni_{3.48}Al_{0.18}$ |

TABLE 2

| | MV (1) (μm) | MV (2) (μm) | MV Difference | D10 (1) (μm) | D10 (2) (μm) | D10 Difference | D90 (1) (μm) | D90 (2) (μm) | D90 Difference |
|---|---|---|---|---|---|---|---|---|---|
| Example 1 | 75.1 | 75.7 | −0.6 | 18.8 | 19.8 | −1 | 152.1 | 149.3 | +2.8 |
| Example 2 | 61.3 | 62 | −0.7 | 15.9 | 17.4 | −1.5 | 134.4 | 138.3 | −3.9 |
| Example 3 | 50.4 | 46.3 | +4.1 | 13.1 | 9.3 | +3.8 | 112.4 | 104.6 | +7.8 |
| Example 4 | 80.8 | 80.7 | +0.1 | 17.5 | 17.9 | −0.4 | 150.2 | 149.6 | +0.6 |
| Example 5 | 25.8 | 25.2 | +0.6 | 8.3 | 8.1 | +0.2 | 47.9 | 48.4 | −0.5 |
| Example 6 | 90.8 | 94.7 | −3.9 | 20.4 | 24.2 | −3.8 | 160.9 | 167.2 | −6.3 |
| Example 7 | 77.8 | 78.7 | −0.9 | 18.1 | 18.4 | −0.3 | 154.4 | 153.1 | +1.3 |
| Example 8 | 40.9 | 42.4 | −1.5 | 11.9 | 11.3 | +0.6 | 65.4 | 67.4 | −2 |
| Example 9 | 76.6 | 72.5 | +4.1 | 16.6 | 15.9 | +0.7 | 147.8 | 136.1 | +11.7 |
| Example 10 | 38.3 | 39.4 | −1.1 | 9.4 | 9.9 | −0.5 | 56.9 | 62.4 | −5.5 |
| Example 11 | 68.6 | 69.1 | −0.5 | 16.9 | 17.5 | −0.6 | 70.8 | 72.7 | −1.9 |

TABLE 2-continued

|  | MV (1) (μm) | MV (2) (μm) | MV Difference | D10 (1) (μm) | D10 (2) (μm) | D10 Difference | D90 (1) (μm) | D90 (2) (μm) | D90 Difference |
|---|---|---|---|---|---|---|---|---|---|
| Example 12 | 72.5 | 68.3 | +4.2 | 17.9 | 16.1 | +1.8 | 153.7 | 150.6 | +3.1 |
| Example 13 | 76.5 | 73.7 | +2.8 | 18.9 | 17.6 | +1.3 | 161.7 | 157.8 | +3.9 |
| Example 14 | 57.4 | 57.7 | −0.3 | 14.2 | 14.7 | −0.5 | 142 | 139.5 | +2.5 |
| Example 15 | 78.9 | 76.1 | +2.8 | 17.5 | 16.3 | +1.2 | 138.6 | 134.8 | +3.8 |
| Example 16 | 74.1 | 73.9 | +0.2 | 18.5 | 18.7 | −0.2 | 148.5 | 150 | −1.5 |
| Example 17 | 58.6 | 59.1 | −0.5 | 15.9 | 16.6 | −0.7 | 138.6 | 139.9 | −1.3 |
| Example 18 | 26.8 | 26.1 | +0.7 | 8.6 | 8.3 | +0.3 | 46.8 | 47.4 | −0.6 |
| Comp. Ex. 1 | 76.1 | 68.3 | +7.8 | 18.9 | 13.4 | +5.5 | 154.3 | 147.2 | +7.1 |
| Comp. Ex. 2 | 71.2 | 65.5 | +5.7 | 17.2 | 13.2 | +4 | 71.2 | 60.1 | +11.1 |
| Comp. Ex. 3 | — | 70.3 | — | — | 18.9 | — | — | 151.6 | — |

TABLE 3

|  | Ra of hydrogen storage alloy powder (μm) | Crushing strength of hydrogen storage alloy powder (gf/mm²) | Discharge capacity at 1st cycle (mAh/g) | Discharge capacity at 5th cycle (mAh/g) | Discharge capacity at 6th cycle (mAh/g) |
|---|---|---|---|---|---|
| Example 1 | 3.5 | 23,034 | 345 | 382 | 330 |
| Example 2 | 3.1 | 28,221 | 341 | 379 | 328 |
| Example 3 | 2.2 | 34,029 | 337 | 370 | 308 |
| Example 4 | 3.2 | 16,741 | 349 | 386 | 334 |
| Example 5 | 3.8 | 19,705 | 348 | 379 | 334 |
| Example 6 | 1.8 | 21,906 | 328 | 364 | 300 |
| Example 7 | 3.3 | 18,991 | 346 | 386 | 337 |
| Example 8 | 2.3 | 36,654 | 324 | 367 | 298 |
| Example 9 | 2.5 | 31,903 | 331 | 370 | 310 |
| Example 10 | 2.9 | 33,900 | 342 | 371 | 309 |
| Example 11 | 2.8 | 22,940 | 341 | 376 | 322 |
| Example 12 | 1.9 | 37,098 | 325 | 364 | 301 |
| Example 13 | 2.3 | 34,476 | 332 | 371 | 311 |
| Example 14 | 2.3 | 21,998 | 335 | 370 | 312 |
| Example 15 | 2.4 | 31,447 | 336 | 370 | 306 |
| Example 16 | 4.7 | 18,564 | 350 | 383 | 334 |
| Example 17 | 2.7 | 24,774 | 339 | 372 | 306 |
| Example 18 | 3.5 | 14,809 | 347 | 382 | 333 |
| Comp. Ex. 1 | 1.6 | 37,982 | 298 | 349 | 277 |
| Comp. Ex. 2 | 1.1 | 40,762 | 286 | 346 | 263 |
| Comp. Ex. 3 | 0.8 | 38,871 | 296 | 348 | 245 |

The results of Examples 6, 8, and 12 demonstrate that, by fulfilling either of the Ra and the crushing strength of the hydrogen storage alloy powder defined in the present invention, superior battery characteristics were achieved compared to Comparative Examples 1 to 3 wherein neither of the two was fulfilled. It was also demonstrated that the remaining Examples fulfill both the Ra and the crushing strength of the hydrogen storage alloy powder defined in the present invention, so that still superior battery characteristics were achieved. Further, comparing Example 1 and Comparative Examples 1 and 3, as well as Example 11 and Comparative Example 2, the compositions were the same in respective pair, but the battery characteristics were inferior in the Comparative Examples, wherein neither of the Ra and the crushing strength of the hydrogen storage alloy powder defined in the present invention was fulfilled.

What is claimed is:

1. Hydrogen storage alloy powder of a composition represented by formula (1):

$$R_{1-a}Mg_aNi_bAl_cM_d$$

wherein R is at least one element selected from the group consisting of rare earth elements including Sc and Y, Zr, Hf, and Ca; M is at least one element selected from the group consisting of elements other than R, Mg, Ni, and Al; and a satisfies $0.005 \leq a \leq 0.40$, b satisfies $3.00 \leq b \leq 4.50$, c satisfies $0 \leq c \leq 0.50$, and d satisfies $0 \leq d \leq 1.00$, with $3.00 \leq b+c+d \leq 4.50$;

wherein said powder has an arithmetical mean roughness (Ra) of powder particle outer surface of not less than 2 μm.

2. The hydrogen storage alloy powder according to claim 1, wherein said powder has a crushing strength of not higher than 35,000 gf/mm².

3. The hydrogen storage alloy powder according to claim 2, wherein said powder has a crushing strength of not higher than 20,000 gf/mm² when $0.01 \leq a \leq 0.15$ and $3.00 \leq b+c+d \leq 3.80$ in formula (1).

4. The hydrogen storage alloy powder according to claim 2, wherein said powder has a crushing strength of not higher than 30,000 gf/mm² when $0.15 < a \leq 0.25$ and $3.00 \leq b+c+d \leq 3.80$ in formula (1).

5. The hydrogen storage alloy powder according to claim 2, wherein said powder has a mean volume diameter (MV) of 20 to 100 μm.

6. An anode active material for a nickel-hydrogen rechargeable battery consisting of the hydrogen storage alloy powder of claim 2.

7. An anode for a nickel-hydrogen rechargeable battery comprising the anode active material of claim 6.

8. A nickel-hydrogen rechargeable battery comprising the anode for a nickel-hydrogen rechargeable battery of claim 7.

9. The hydrogen storage alloy powder according to claim 1, wherein said powder has a crushing strength of not higher than 20,000 gf/mm² when $0.01 \leq a \leq 0.15$ and $3.00 \leq b+c+d \leq 3.80$ in formula (1).

10. The hydrogen storage alloy powder according to claim 1, wherein said powder has a crushing strength of not higher than 30,000 gf/mm² when $0.15 < a \leq 0.25$ and $3.00 \leq b+c+d \leq 3.80$ in formula (1).

11. The hydrogen storage alloy powder according to claim 1, wherein said powder has a mean volume diameter (MV) of 20 to 100 μm.

12. An anode active material for a nickel-hydrogen rechargeable battery consisting of the hydrogen storage alloy powder of claim 1.

13. An anode for a nickel-hydrogen rechargeable battery comprising the anode active material of claim 12.

14. A nickel-hydrogen rechargeable battery comprising the anode for a nickel-hydrogen rechargeable battery of claim 13.

15. Hydrogen storage alloy powder of a composition represented by formula (1):

$$R_{1-a}Mg_aNi_bAl_cM_d$$

wherein R is at least one element selected from the group consisting of rare earth elements including Sc and Y, Zr, Hf, and Ca; M is at least one element selected from the group consisting of elements other than R, Mg, Ni, and Al; and a satisfies $0.005 \leq a \leq 0.40$, b satisfies $3.00 \leq b \leq 4.50$, c satisfies $0 \leq c \leq 0.50$, and d satisfies $0 \leq d \leq 1.00$, with $3.00 \leq b+c+d \leq 4.50$;

wherein said powder has a crushing strength of not higher than 35,000 gf/mm$^2$.

16. The hydrogen storage alloy powder according to claim 15, wherein said powder has a crushing strength of not higher than 20,000 gf/mm$^2$ when $0.01 \leq a \leq 0.15$ and $3.00 \leq b+c+d \leq 3.80$ in formula (1).

17. The hydrogen storage alloy powder according to claim 15, wherein said powder has a crushing strength of not higher than 30,000 gf/mm$^2$ when $0.15 < a \leq 0.25$ and $3.00 \leq b+c+d \leq 3.80$ in formula (1).

18. The hydrogen storage alloy powder according to claim 15, wherein said powder has a mean volume diameter (MV) of 20 to 100 μm.

19. An anode active material for a nickel-hydrogen rechargeable battery consisting of the hydrogen storage alloy powder of claim 15.

20. An anode for a nickel-hydrogen rechargeable battery comprising the anode active material of claim 19.

21. A nickel-hydrogen rechargeable battery comprising the anode for a nickel-hydrogen rechargeable battery of claim 20.

* * * * *